United States Patent
Krafka et al.

(10) Patent No.: US 10,242,280 B2
(45) Date of Patent: *Mar. 26, 2019

(54) DETERMINING REGIONS OF INTEREST BASED ON USER INTERACTION

(71) Applicant: Google LLC, Mountain View, CA (US)

(72) Inventors: Kyle John Krafka, Athens, GA (US); Alan Sheridan, Apex, NC (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,388

(22) Filed: Nov. 7, 2017

(65) Prior Publication Data

US 2018/0157926 A1  Jun. 7, 2018

Related U.S. Application Data

(63) Continuation of application No. 15/079,519, filed on Mar. 24, 2016, now Pat. No. 9,842,268.

(Continued)

(51) Int. Cl.
*G06K 9/20* (2006.01)
*G06K 9/32* (2006.01)

(Continued)

(52) U.S. Cl.
CPC ....... *G06K 9/2081* (2013.01); *G06F 3/04815* (2013.01); *G06K 9/3208* (2013.01);

(Continued)

(58) Field of Classification Search
CPC .............. G06F 17/5004; G06F 2217/04; G06F 17/30241; G06F 1/1641; G06F 8/34; G06F 3/0416; G06F 2203/04806; G06F 17/30247; G06F 3/04842; G06F 17/30268; G06F 17/30554; G06F 3/04815; G06F 1/163; G06F 21/32; G06F 21/34; G06F 2221/2153; G08B 13/19645; H04N 5/232;

(Continued)

(56) References Cited

U.S. PATENT DOCUMENTS 6,028,608 A * 2/2000 Jenkins ................. G06T 1/0021
345/619
8,086,047 B2   12/2011 Penke et al.

(Continued)

OTHER PUBLICATIONS

Heatmap.js, "Dynamic Heatmaps for the Web", downloaded Apr. 1, 2015, 3 pages.

(Continued)

*Primary Examiner* — Aklilu K Woldemariam
(74) *Attorney, Agent, or Firm* — Lerner, David, Littenberg, Krumholz & Mentlik, LLP

(57) ABSTRACT

A system and method provide for determining regions of interest within an image based on viewer interaction with the image. At least one image associated with a location is provided for display in a viewport, and pose data related to user interaction with the at least one image is identified. Weights are assigned to portions of the at least one image based on the pose data, the weights indicating at least a period of time the portion of the at least one image is generally at a center of the viewport. Based on the assigned weights, image regions of interest of the at least one image are determined.

20 Claims, 9 Drawing Sheets

Related U.S. Application Data

(60) Provisional application No. 62/139,135, filed on Mar. 27, 2015.

(51) Int. Cl.

| | | |
|---|---|---|
| *G06T 11/20* | (2006.01) | |
| *G06T 7/00* | (2017.01) | |
| *G06K 9/40* | (2006.01) | |
| *G06T 7/11* | (2017.01) | |
| *G06F 3/0481* | (2013.01) | |

(52) U.S. Cl.
CPC ............. *G06K 9/3233* (2013.01); *G06K 9/40* (2013.01); *G06T 7/004* (2013.01); *G06T 7/11* (2017.01); *G06T 11/206* (2013.01); *G06T 2207/20104* (2013.01)

(58) Field of Classification Search
CPC .... H04N 5/23216; H04N 5/247; H04N 7/181; H04N 7/185; G09G 5/14; G09G 5/373; G09G 2300/023; G06T 17/05; G06T 2200/28; G06T 11/60; G06T 11/06; G06T 17/00; G06T 17/20; G06T 19/00; G06T 13/80; G06T 15/20; G06T 19/003; G06T 11/206; G06T 2200/24; G06T 2207/20221; G06T 5/50; G06T 7/30; G06T 2207/20104; G06T 7/004; G06T 7/11; G05B 2219/31467; G05B 2219/31469; G05B 2219/31472; G05B 19/048; G01C 21/3667; G01C 21/3614; G09B 29/106; H04L 67/22; H04L 43/045; H04L 63/0861; G06K 2009/00328; G06K 9/00221; G06K 9/00268; G06K 9/00295; G06K 9/00677; G06K 9/2081; G06K 9/3208; G06K 9/3233; G06K 9/40; G06Q 30/02; G06Q 10/02; G06Q 30/00; G06Q 30/0282; G06Q 30/0283; G06Q 50/12; G06Q 50/14
USPC ......... 382/225, 282; 345/440, 589, 619, 629
See application file for complete search history.

(56) References Cited

U.S. PATENT DOCUMENTS

| | | | |
|---|---|---|---|
| 8,379,053 B1 | 2/2013 | Phillips et al. | |
| 8,437,984 B2 | 5/2013 | McGreevy et al. | |
| 8,515,973 B1* | 8/2013 | Jurca | G06F 17/30864 |
| | | | 707/730 |
| 9,026,516 B1* | 5/2015 | Chapin | G06F 17/3087 |
| | | | 707/706 |
| 2007/0216709 A1* | 9/2007 | Kojima | G06F 3/1415 |
| | | | 345/619 |
| 2008/0077583 A1 | 3/2008 | Castro et al. | |
| 2009/0189920 A1* | 7/2009 | Chiu | G06K 9/00456 |
| | | | 345/662 |
| 2009/0238460 A1* | 9/2009 | Funayama | G06K 9/4671 |
| | | | 382/181 |
| 2010/0042676 A1* | 2/2010 | Seroussi | G06F 17/5004 |
| | | | 709/203 |
| 2010/0115462 A1 | 5/2010 | Spencer et al. | |
| 2010/0211909 A1* | 8/2010 | Ghanekar | G06F 17/30241 |
| | | | 715/788 |
| 2011/0214085 A1 | 9/2011 | Vanbree | |
| 2011/0252300 A1* | 10/2011 | Lloyd | G06F 17/246 |
| | | | 715/217 |
| 2012/0221595 A1 | 8/2012 | Slowe et al. | |
| 2012/0262472 A1 | 10/2012 | Garr et al. | |
| 2012/0299920 A1* | 11/2012 | Coombe | G06T 19/00 |
| | | | 345/423 |
| 2012/0306915 A1* | 12/2012 | Takemura | G06F 3/1454 |
| | | | 345/629 |
| 2013/0010111 A1* | 1/2013 | Laforte | G08B 13/19645 |
| | | | 348/143 |
| 2013/0035853 A1* | 2/2013 | Stout | G06T 17/05 |
| | | | 701/438 |
| 2013/0100018 A1* | 4/2013 | Honji | G06F 3/0416 |
| | | | 345/158 |
| 2013/0181993 A1 | 7/2013 | Herring et al. | |
| 2013/0232430 A1* | 9/2013 | Reitan | G06F 3/0484 |
| | | | 715/765 |
| 2013/0249939 A1* | 9/2013 | Schiel | G09G 5/00 |
| | | | 345/629 |
| 2013/0262588 A1* | 10/2013 | Barak | H04L 67/22 |
| | | | 709/204 |
| 2013/0328921 A1 | 12/2013 | Kuppusamy | |
| 2013/0346855 A1* | 12/2013 | Appleton | G09B 29/007 |
| | | | 715/273 |
| 2014/0359510 A1* | 12/2014 | Graf | G01C 21/3667 |
| | | | 715/771 |
| 2015/0116309 A1* | 4/2015 | Ofstad | G06T 13/20 |
| | | | 345/419 |
| 2015/0146167 A1* | 5/2015 | Lange | A61H 5/00 |
| | | | 351/203 |
| 2015/0185990 A1* | 7/2015 | Thompson | G06F 3/0484 |
| | | | 715/800 |
| 2017/0011210 A1* | 1/2017 | Cheong | H04W 12/06 |

OTHER PUBLICATIONS

T. Judd, K. Ehinger, F. Durand and A. Torralba, "Learning to Predict Where Humans Look," Proc. IEEE Int'l Conf. Computer Vision, 2009. Downloaded Apr. 1, 2015, 8 pages.

* cited by examiner

DETERMINING REGIONS OF INTEREST BASED ON USER INTERACTION

CROSS-REFERENCE TO RELATED APPLICATIONS

The present application is a continuation of U.S. patent application Ser. No. 15/079,519, filed Mar. 24, 2016, which claims the benefit of the filing date of U.S. Provisional Patent Application No. 62/139,135, filed Mar. 27, 2015, the entire disclosures of which are hereby incorporated herein by reference.

BACKGROUND OF THE INVENTION

There are currently a variety of ways to track a viewer's attention to visual stimuli. Eye trackers provide accurate data, but require specialized hardware, which is not a practical approach to collect this data from the masses. Some computer-based attention tracking software and web analytics packages keep track of mouse pointer movement, which may correlate to viewer attention, but not always. This technique is also insufficient for interactive scenarios, where mouse locations mean different things as content changes.

BRIEF SUMMARY OF THE INVENTION

Users can view panoramas of geographic locations over the Internet. For example, a user can visit a maps website and view street-level panoramas of a multitude of locations. These panoramas may be provided by the website owner, contracted photographers, users, etc. There is an ever-increasing amount of panorama content being created, and also being consumed.

By processing the events that take place inside an image viewer, statistics and heat maps may be produced to accurately reflect viewer attention while viewing an image. Different actions can be weighted and applied to the overall attention in a given area. A user's state in an image can be described with an image ID, a heading value, a pitch value, and a zoom value. Changes to these values, where the image ID remains fixed, may be recorded. Default values used when initially loading the image may be given very little weight. When a user zooms into a specific area, more weight can be given to a more localized area.

Location of view can be determined by what part of the image is in the center of the viewport. A 2D Gaussian distribution placed at this center point and stretched to fill the viewport may be a good descriptor of viewing likelihood. Other events such as location of clicks and mouse movements could be factored in with a lower weight. Finally, time spent looking at different viewports should play a role in deciding how much to weight the popularity of viewing certain locations.

This technique could be extended to help identify points of interest in 3D space. By correlating hot spots of viewing activity between multiple image, along with pose information (e.g., where the panoramas are positioned and their rotation), physical locations can be identified as being interesting. Coupled with the 3D geometry of a location, 3 dimensional heat maps may be generated that project view location density from the panoramas to their actual locations in real space. This method could be applied to several other measures of interestingness or objectness to build a meaningfully annotated 3D version of the world. Choosing good points of interest has a variety of applications, perhaps most importantly that the best content can be served to the user.

This information could be used in very novel ways. Viewer activity could be used to better determine the best place to look in panoramas. Applications of knowing where to look in a panorama are far-reaching, including thumbnail selection, initial direction to look when entering a panorama, and making more interesting tours.

One aspect of the disclosure provides a computer-implemented method, comprising providing, using one or more computing devices, at least one image associated with a location for display in a viewport; identifying, using the one or more computing devices, pose data related to user interaction with the at least one image; assigning, using the one or more computing devices, weights to portions of the at least one image based on the pose data, the weights indicating at least a period of time the portion of the at least one image is generally at a center of the viewport; and determining, using the one or more computing devices, image regions of interest of the at least one image based on the assigned weights. In some examples, this method may further include orienting the at least one image in the viewport based on the determined image regions of interest. Such orienting may include adjusting at least one of a zoom level, a pan, and a point of view from which the image is captured. Moreover, this method may include generating, using the one or more processors, heat map data for the location based the assigned weights for the at least one image, the heat map data indicating one or more areas of interest at the location. The heat map data may be overlaid onto a 3D panoramic view of the location.

Another aspect of the disclosure provides a system, comprising a memory storing at least one image corresponding to a geographic location and one or more processors in communication with the memory. The one or more processors may be configured to provide at least one image associated with a location for display in a viewport, identify pose data related to user interaction with the at least one image, assign weights to portions of the at least one image based on the pose data, the weights indicating at least a period of time the portion of the at least one image is generally at a center of the viewport, and determine image regions of interest of the at least one image based on the assigned weights.

Yet another aspect of the disclosure provides a non-transitory computer readable medium storing instruction executable by one or more processors for performing a method. This method may include providing at least one image associated with a location for display in a viewport, identifying pose data related to user interaction with the at least one image, assigning weights to portions of the at least one image based on the pose data, the weights indicating at least a period of time the portion of the at least one image is generally at a center of the viewport, and determining image regions of interest of the at least one image based on the assigned weights.

DETAILED DESCRIPTION

Figure 1:
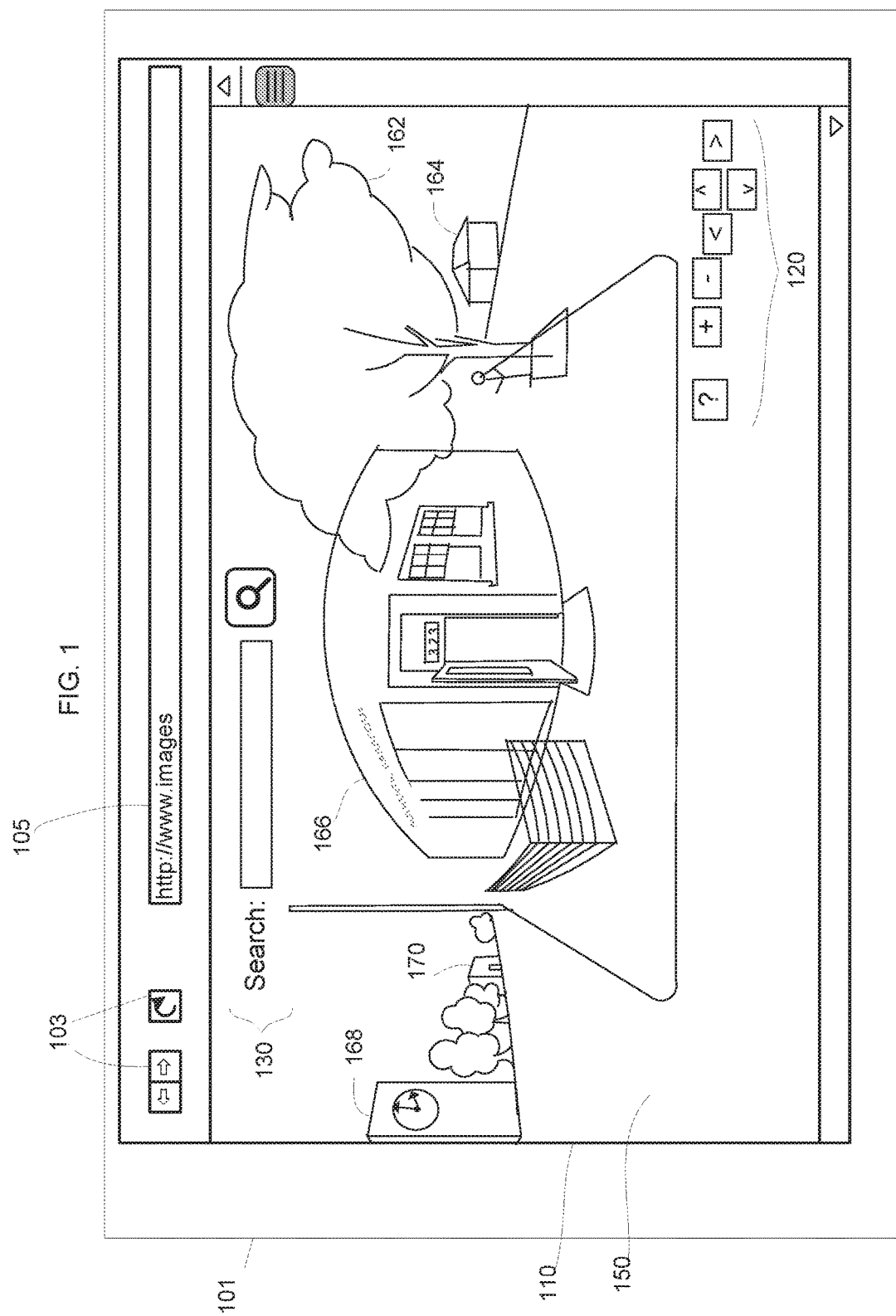
FIG. 1 is an example screenshot including an image according to aspects of the disclosure.

The present disclosure relates to determining portions of interest in an image, for example, based on user interaction with the image. For example, data relating to user viewing and interacting with an image may be interpreted, collected, and stored. Portions of images that are more interesting or popular may be determined based on this aggregated data. This information may be useful, for example, to determine additional information to provide with the image.

The image may be, for example, a street-level panorama. The image may be viewed by a user through a viewport on any of a variety of computing devices. The user interaction may include activity such as panning, zooming, clicking, viewing for a predetermined period of time, or any other activity or combination of activities. Such activity may produce pose data collected by a server. For example, if the user zooms in on a building number of a particular building on a street, pose data indicating the zoomed-in portion of the image may be stored.

In one example, portions of the image may be weighted based on the user interaction. Greater weight may be assigned to portions of the image that are positioned generally centrally in the viewport by the user. For example, if the user pans and zooms the panorama to place an object such as a street sign in the center of the viewport, the street sign may be weighted greater than other objects in the image.

In another example, a heat map may be used in determining the most interesting portions of the image. For example, portions of the image with greater activity may be indicated as "hot" while other portions of the image are indicated as "cold."

The collected pose data and/or heat maps may be used as an analytics tool. For example, it may be used to determine what information people are interested in for a given area. Such information may include restaurant menus, addresses, parking/driving restrictions, landmarks, etc. In some examples, this information may be used to orient a default view of an image in a viewport. For example, it may be determined based on users' interactions with images of a geographic location that the users are most interested in viewing a monument at the geographic location. While a default view of an address near the geographic location may not initially include the monument, the default view may be updated based on the determined interesting portions of the image. For example, the updated default view may have a different point of view from a different image capture position, such that the monument is also visible in addition to the address.

Portions of the images determined to be of greater interest may further be used to determine what advertisements would be most effective for a given image. It can also be used to predict where users will look in an image, for example, such that interesting thumbnail images can be generated. In another example, the information may be used by business owners to determine what further information (e.g., directions, menus, hours of operation, photos, etc.) should be provided on a website for the business.

FIG. 1 is an example screenshot including an image according to aspects of the disclosure. A computing device 101 displays one or more images, such as image 150, to a user through a viewport. For example, the computing device 101 may include a display screen on which information, such as web content, can be provided. The web content may be provided through a browser having navigation controls 103, an address field 105, and a viewport 110. The viewport 110 need not be part of the browser, but instead can be part of an application, part of the display itself, etc. The image 150 may be a panorama corresponding to a particular geographic location. For example, in response to entering a location in search field 130, the user may be provided with one or more images. The one or more images may be stitched together.

As shown in FIG. 1, the image 150 includes various objects in different image regions. A tree 162 and a building 164 are located towards a right portion of the image 150, a restaurant 166 is located near a center portion of the image 150, and a monument 16 and second building 170 are located towards a left portion of the image 150. The user may interact with the image 150, for example, using image controls 120. Such image controls 120 may allow the user to zoom in or out, pan up/down or left/right, change a point of view, etc. For example, the user can view the restaurant 166 from behind by clicking on a portion of the image 150 near the second building 170 and/or using image controls 120. In another example, an owner of the restaurant 166 may have provided images of its interior, and the user may view the interior portion of the restaurant 166 by clicking or otherwise interacting with the image 150.

Data regarding the user interactions with one or more images may be recorded and analyzed. For example, such data may be used to determine which portions of the image 150 are most interesting to users. This information can further be used to set default images that are returned in response to future requests by users, to identify relevant advertisements, to indicate to business owners what information is lacking from their websites, etc. Such data regarding user interactions may include pose data. For example, positioning of the image 150 within the viewport 110 may be considered. Objects positioned in a general center of the viewport 110 for a predetermined period of time may be determined to be more interesting to viewers than other objects. Other pose data may include objects that are clicked on, zoomed-in on, hovered over with a cursor, viewed from different perspectives, etc.

Figure 2:
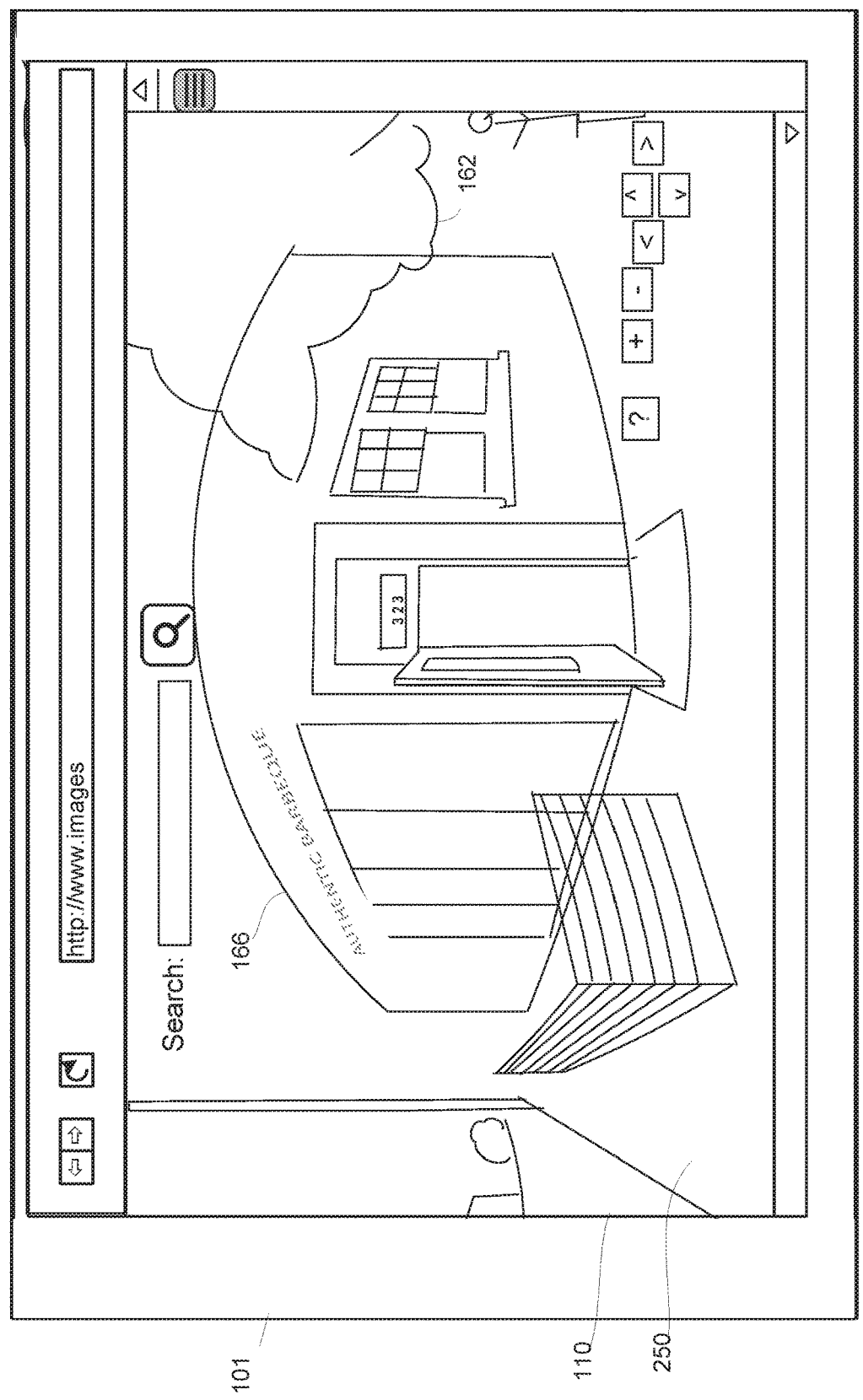
FIG. 2 is an example screenshot including the image of FIG. 1 after user interaction according to aspects of the disclosure.

FIG. 2 is an example screenshot including the image of FIG. 1 after user interaction. In this example, the restaurant 166 is enlarged and focused in a general center of the viewport 110, thereby producing a zoomed image view 250. Based on this view 250, pose data may be collected indicating viewer interest in the restaurant 166.

Figure 3:
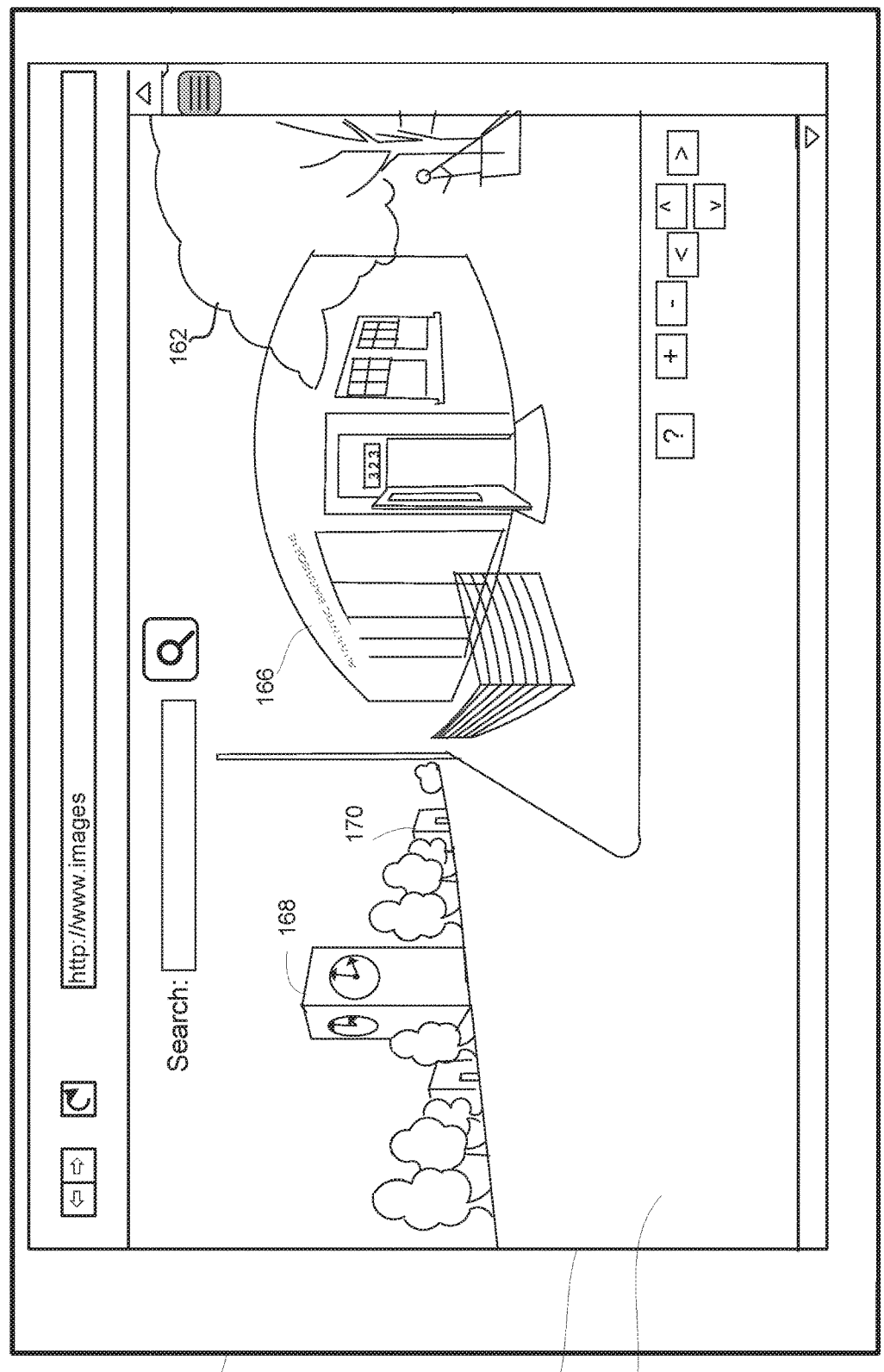
FIG. 3 is another example screenshot including the image of FIG. 1 after user interaction according to aspects of the disclosure.

FIG. 3 is another example screenshot including the image of FIG. 1 after user interaction. In this example, the original image 150 is panned in the viewport 110 to produce view 350. In the view 350, the monument 168 and second building 170 are moved towards the center of the viewport 110. Additionally, objects not originally visible in the viewport, such as third building 372, are now visible. Moreover, other objects originally visible are no longer seen within the viewport 110. Based on such positioning, pose data may be collected indicating viewer interest in objects such as the monument 168.

According to some examples, weights may be assigned to the different pose data. For example, weights may be assigned to image regions in a center of the viewport. In determining what part of the image is in the center of the viewport, a 2D Gaussian distribution may be placed at a center point and stretched to fill the viewport. Other events such as location of clicks and mouse movements could be assigned a lower weight. Moreover, time spent looking at different viewports may also be a factor in assigning weight to certain image regions. Regions of an image that are viewed and/or interacted with more frequently may be assigned a higher weight than other portions of the image. For example, because the restaurant 166 was enlarged and held in a central portion of the viewport 110 (FIG. 2), the restaurant may receive a higher weight than, for example, the tree 162. Similarly, because panned image 350 moved the monument 168 towards the center of the viewport 110, image regions around the monument 168 may be weighted higher than other image regions.

Different actions can be weighted and applied to the overall attention in a given area. A user's state in an image can be described with an image ID, a heading value, a pitch value, and a zoom value. Changes to these values, where the image ID remains fixed, may be recorded. Default values used when initially loading the image may be given very little weight. When a user zooms into a specific area, more weight can be given to a more localized area.

As pose data may be collected from a number of users, a number of times an image region is positioned in a general center of the viewport may also be considered. For example, if a predetermined percentage of viewers or a threshold number of viewers manipulate the original image 150 (FIG. 1) to the view 350 (FIG. 3), this may indicate that the monument 168 and/or the second building 170 are interesting objects in the image.

Figure 4:
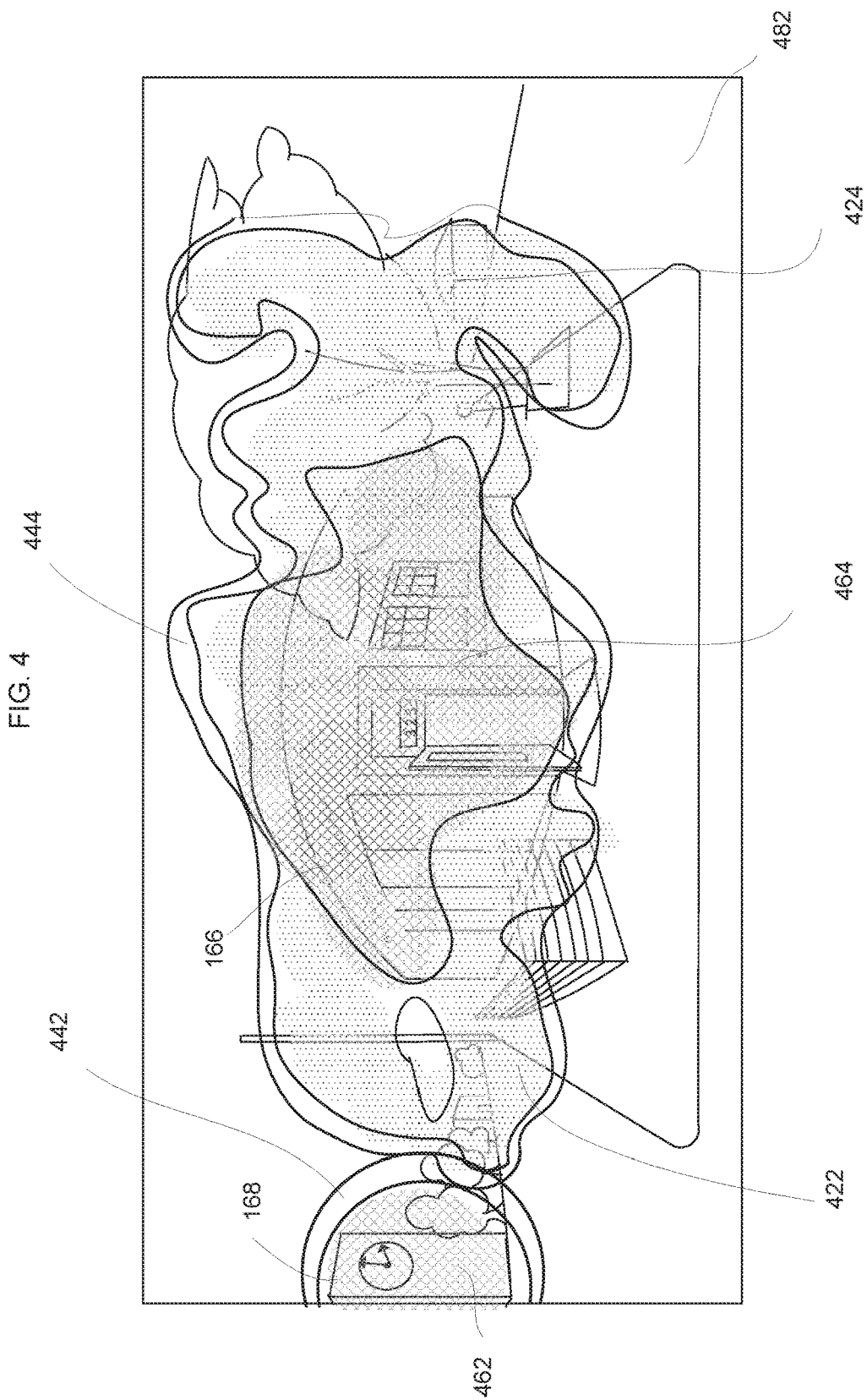
FIG. 4 is an example heat map based on user interaction according to aspects of the disclosure.

By processing the events that take place inside an image viewer, statistics and heat maps may be produced to accurately reflect viewer attention while viewing an image. FIG. 4 is an example heat map based on user interaction according to aspects of the disclosure. The heat map may be generated, for example, based on the weights assigned to the different pose data. Image regions identified as being of particular interest based on the user interaction may be considered hot spots, while regions having less interaction are warm, cool, or not relevant. For example, regions 462 and 464 may be determined to be hot spots based on the user's interaction with the imagery. Accordingly, regions 462, 464 may appear in a particular color, such as red, or shading or other indicator distinguishing them from other portions of the image. Image regions 422, 424 may also be determined to be of some interest based on the user interaction, but less so than the hot spots 462, 464. For example, weights assigned to regions 422, 424 may be lower than weights assigned to the regions 462, 464, but higher than weights assigned to other image regions. Accordingly, regions 422, 424 may be indicated to be warm spots, as indicated by a particular color, such as purple, shading, etc. Image regions 442, 444 may be near image regions 422, 424, 462, 464, but may be determined to be further away from the regions of interest. These regions 442, 444 may be considered cool spots, indicated by blue color or a different shading or the like.

The heat map may be overlaid on the image, or otherwise correlated with the image. As such, the heat map may indicate particular objects in the image that are interesting to users. For example, hot spot 464 generally coincides with the restaurant 166, and hot spot 462 generally coincides with the monument 168. The restaurant 166 and the monument 168 may thus be determined to be the interesting objects in the image. Other image regions, such as region 482, may be determined to be of little or no interest.

Figure 5:
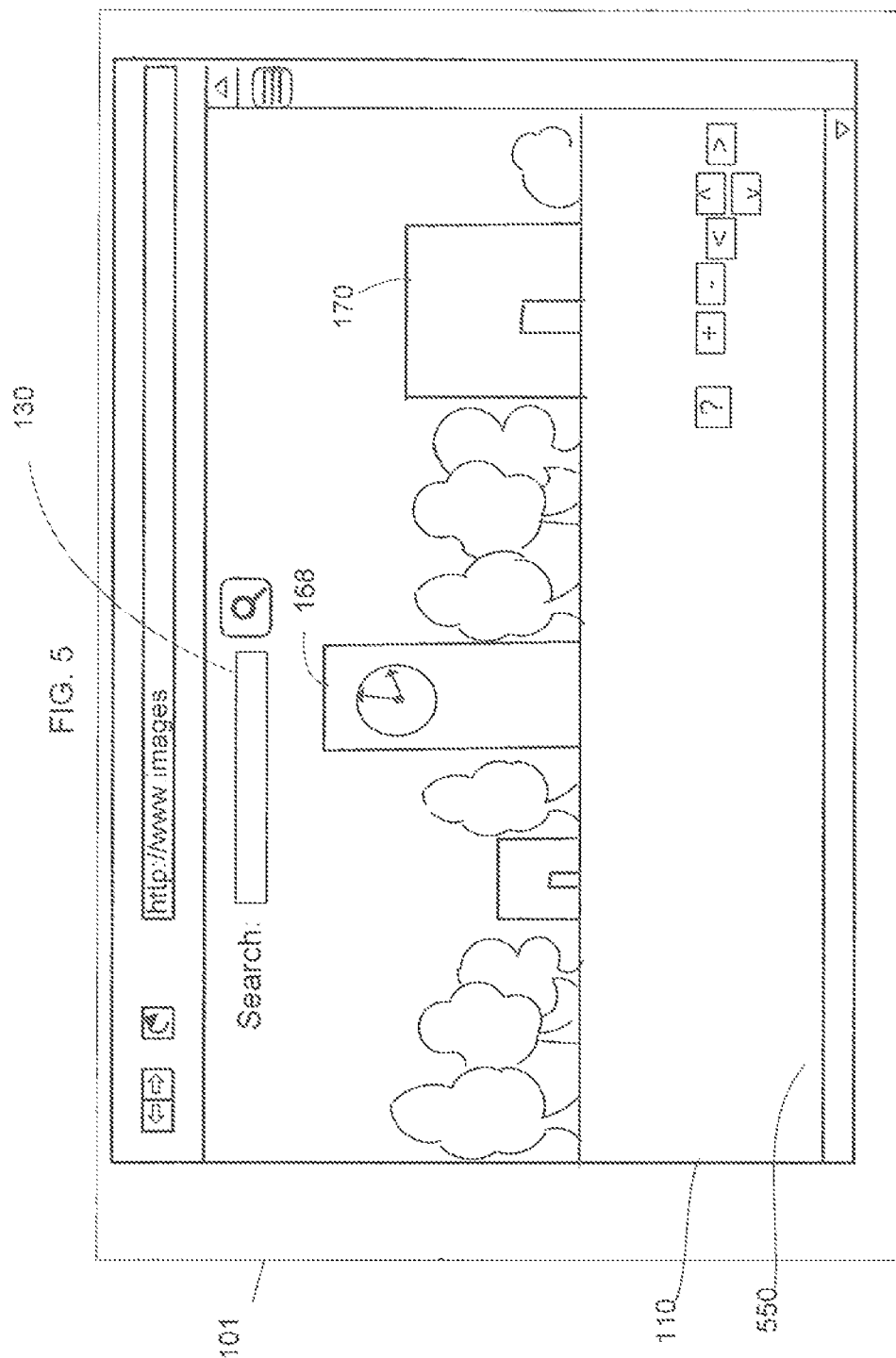
FIG. 5 is another example screenshot including another image according to aspects of the disclosure.

According to some examples, the determined regions or objects of interest in an image may be used to set a default view for a given geographic location. FIG. 5 provides an example, where the user entered a search in field 130 for an address corresponding to the second building 170. An original default view may include only the second building 170 from a point of view of someone standing in front of the second building 170. However, having determined that the monument 168 is of particular interest to viewers based on viewer interaction, the default view may be expanded to also include the monument 168, as shown in adjusted view 550. In other examples, the adjusted view may be from a different perspective, may be positioned differently in the viewport 110, or may be otherwise adjusted to show the monument 168.

Figure 6:
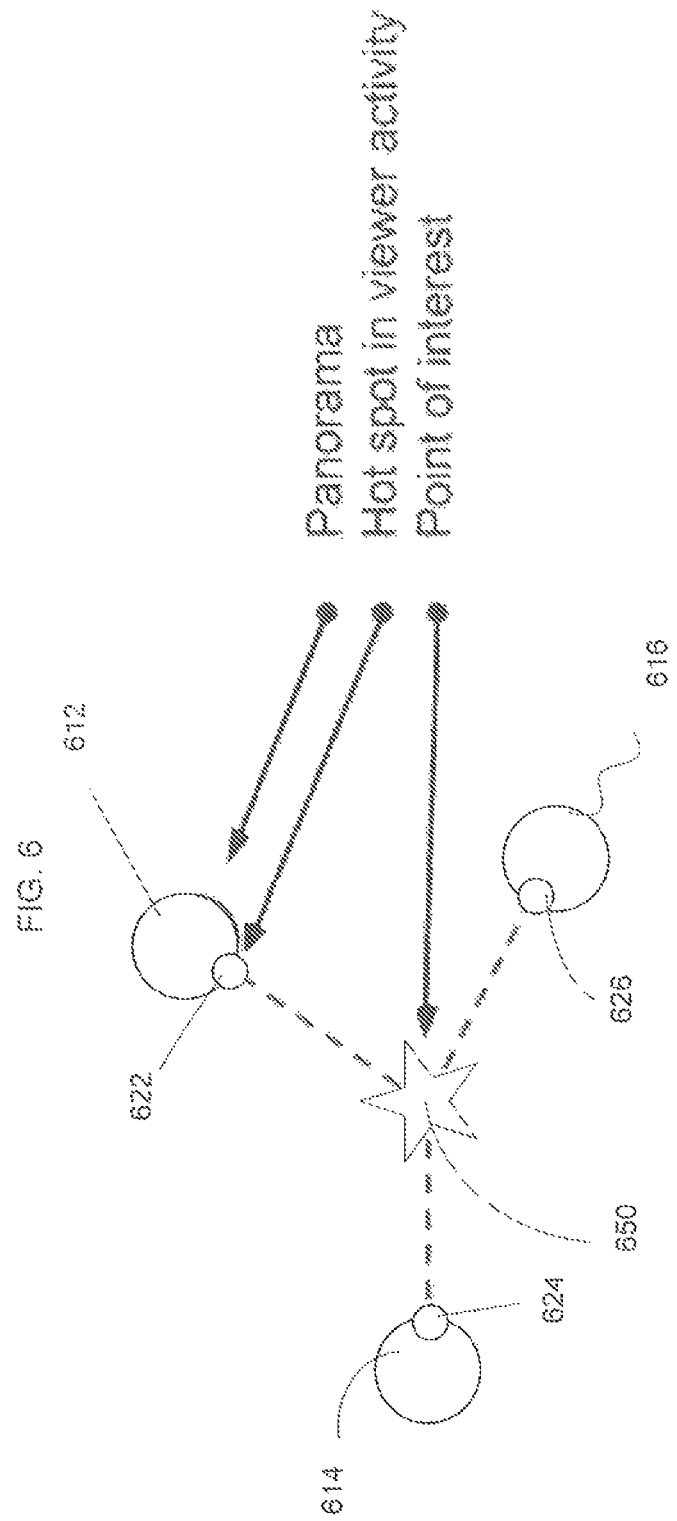
FIG. 6 is an example of correlating hot spots in viewer activity among multiple images according to aspects of the disclosure.

FIG. 6 is an example of correlating hot spots in viewer activity among multiple images. Images 612, 614, and 616 may each include a hot spot 622, 624, 626 of view activity. In some examples, the images 612-616 may be panoramic images which include some degree of overlap with one another. By correlating the hot spots 622-626 of the multiple images 612-616, point of interest 650 may be determined. For example, the point of interest 650 may be partially or fully shown in each of the images 612-616. Moreover, each of the images 612-616 may be manipulated by one or more viewers to more clearly see the point of interest 650. The correlation may include, for example, vector analysis, location matching, or any other technique.

Figure 7:
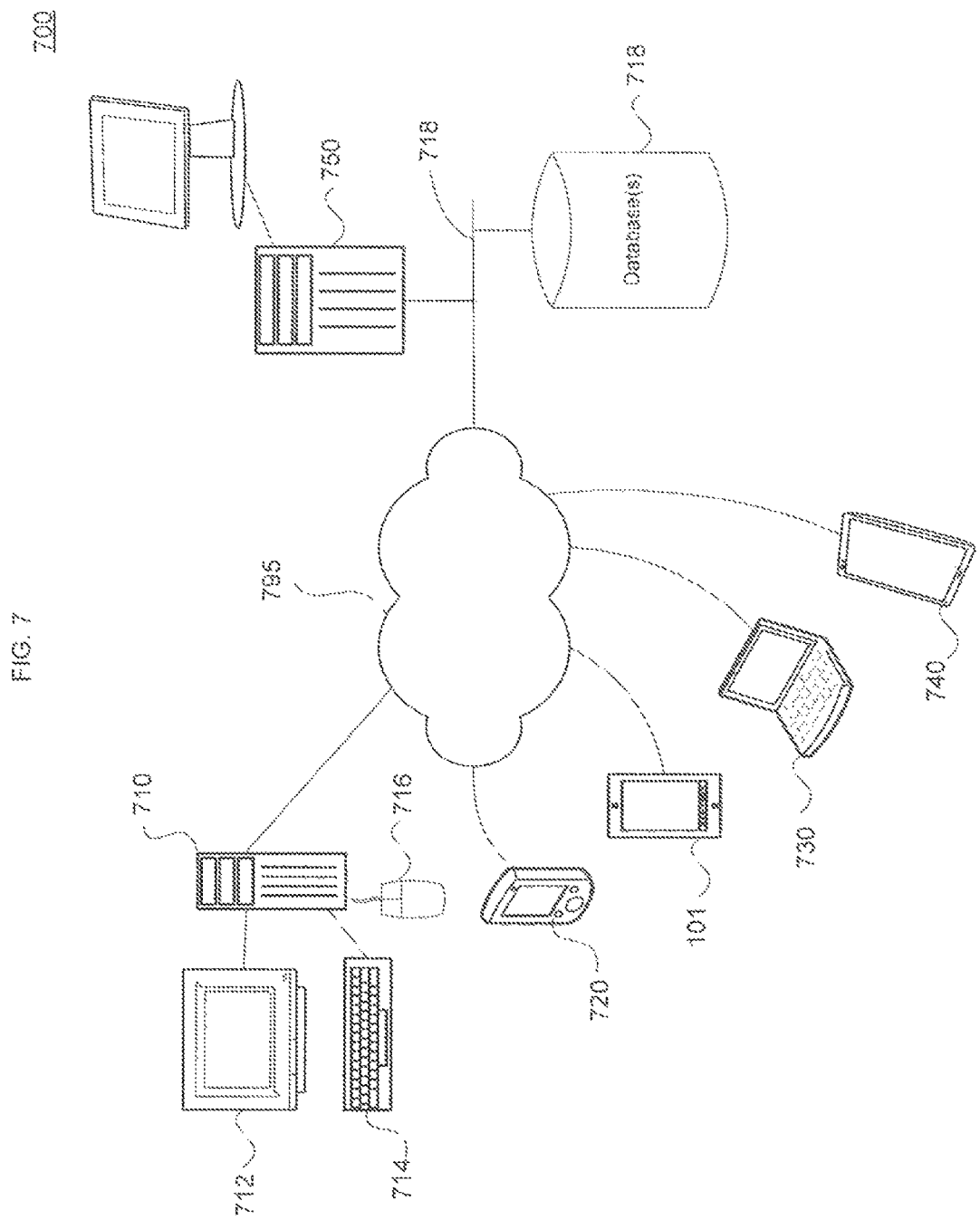
FIG. 7 is a pictorial diagram of an example system according to aspects of the disclosure.

FIG. 7 is an example of a system 700 including computing devices for performing aspects of the present disclosure. As shown, system 700 depicts various computing devices that can be used alone or in a networked configuration. For example, this figure illustrates a computer network 795 having a plurality of computers 710 and 720 as well as other types of mobile devices like mobile computing device 101 from FIG. 1, a PDA 770, laptop/netbook 780 and tablet computing device 750. These various devices may be interconnected via a local bus or direct connection 718 and/or may be coupled via a communications network 795 such as a LAN, WAN, the Internet, etc. and which may be wired or wireless.

Each computing device may include, for example, user input devices such as a keyboard 712 and mouse 714 and/or various other types of input devices such as pen-inputs, joysticks, buttons, touch screens, etc., as well as a display 716, which could include, for instance, a CRT, LCD, plasma screen monitor, TV, projector, etc. Each computer 710 and 720 may be a personal computer, application server, etc. By way of example only, computer 710 may be a personal computer while computer 720 may be a server. Databases, such as database 718, are accessible to one or more of the servers or other devices of system 700.

Figure 8:
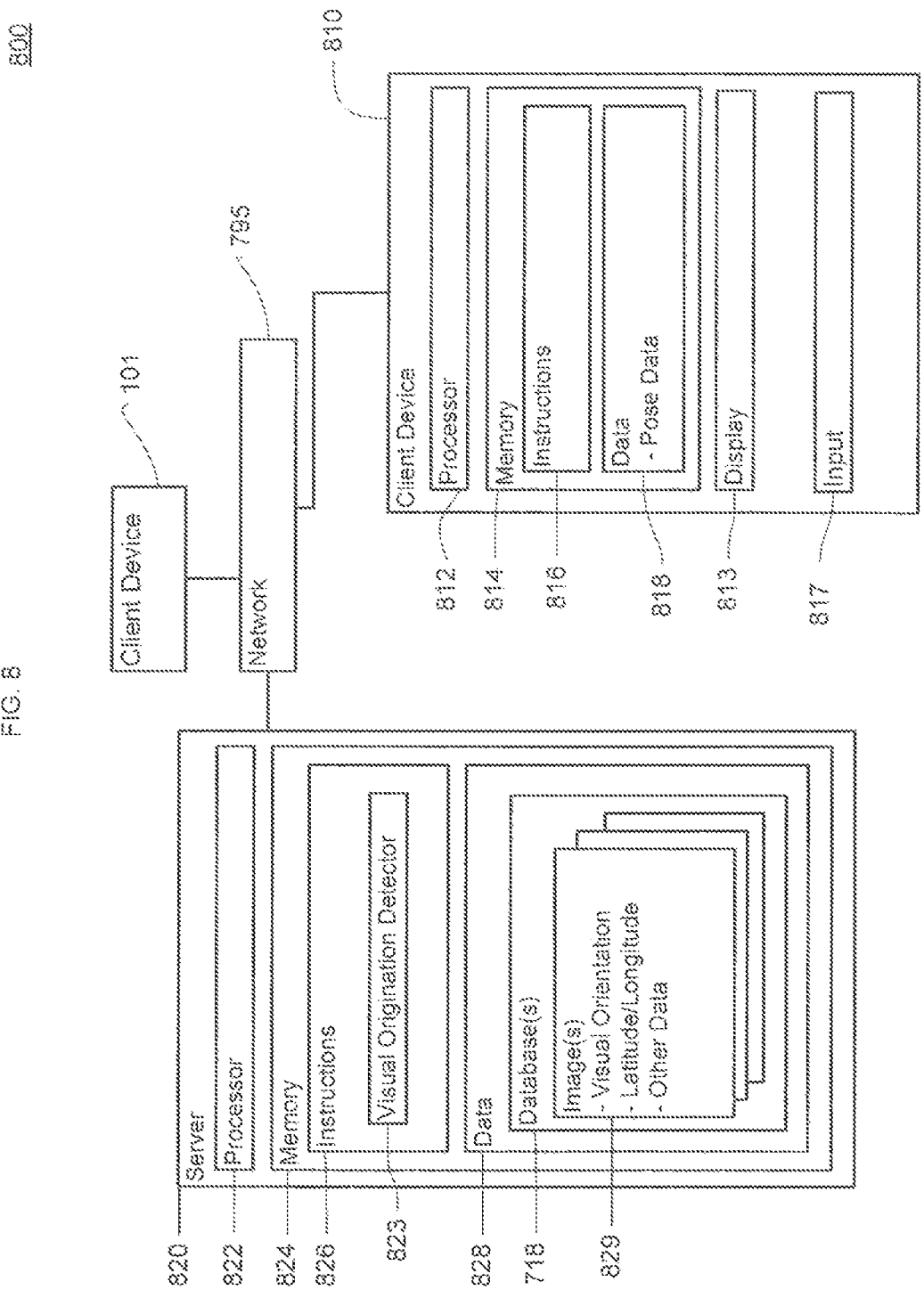
FIG. 8 is a block diagram of the example system of FIG. 7.

FIG. 8 is another example of a system 800, which may be used to detect the location of a mobile device based on captured semantic indicators as described herein. As shown, the system 800 includes a number of client devices, such as client devices 101 and 810, capable of communicating with a server 820 over network 795. The server 820 may include one or more processors 822, memory 824, and other components typically present in general purpose computers.

Memory 824 of server 820 may store information that is accessible by the processors 822, including instructions 826 that may be executed by the processors 822, and data 828. The memory 824 may be of a type of memory operative to store information accessible by the processors 822, including a non-transitory computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The subject matter disclosed herein may include different combinations of the foregoing, whereby different portions of the instructions 826 and data 828 are stored on different types of media.

Although FIG. 8 functionally illustrates the processors 822 and memory 824 as being within the same block, the processors 822 and memory 824 may actually include multiple processors and memories that may or may not be stored within the same physical housing. For example, some of the instructions 826 and data 828 may be stored on removable CD-ROM and others within a read only computer chip. Some or all of the instructions and data may be stored in a location physically remote from, yet still accessible by, the processors 822. Similarly, the processors 822 may actually comprise a collection of processors, which may or may not operate in parallel.

Data 828 may be retrieved, stored or modified by processors 822 in accordance with the instructions 826. For instance, although the present disclosure is not limited by a particular data structure, the data 828 may be stored in computer registers, in a relational database as a table having a plurality of different fields and records, XML documents, or flat files. The data 828 may also be formatted in a computer-readable format such as, but not limited to, binary values, ASCII or Unicode. By further way of example only, the data 912 may be stored as bitmaps comprised of pixels that are stored in compressed or uncompressed, or various image formats (e.g., JPEG), vector-based formats (e.g., SVG) or computer instructions for drawing graphics. Moreover, the data 828 may comprise information sufficient to identify the relevant information, such as numbers, descriptive text, proprietary codes, pointers, references to data stored in other memories (including other network locations) or information that is used by a function to calculate the relevant data. In this example, the data 828 includes database 718 for storing images 829, such as panoramas, of a number of different locations.

Database 718 may store the images 829 in association with other information, such as orientation information, geographic location information, etc. In this regard, as information such as geographic coordinates, map information, or the name of a business, city, or the like is received from the client device 810, images may be returned. While the database 827 is shown within the server 820 in FIG. 8, it should be understood that the server may additionally or alternatively be located remotely from the server 820. For example, the server 820 may access multiple databases in various locations. In some examples, the different databases may be store different types of information.

The server 820 may be at one node of network 795 and capable of directly and indirectly communicating with other nodes of the network 795. For example, the server 820 may include a web server that may be capable of communicating with client devices 101 and 810 via network 795 such that it uses the network 795 to transmit and display information to a user on a display 813 of the client device 810. Server 820 may also include a plurality of computers, e.g., a load balanced server farm, that exchange information with different nodes of a network for the purpose of receiving, processing and transmitting data to client devices 101 and 810. In this instance, the client devices 101 and 810 will typically still be at different nodes of the network 795 than the computers comprising server 820.

Network 795, and intervening nodes, may include various configurations and protocols including the Internet, World Wide Web, intranets, virtual private networks, wide area networks, local networks, private networks using communication protocols proprietary to one or more companies, Ethernet, WiFi (e.g., 802.11, 802.11b, g, n, or other such standards), HTTP, and various combinations of the foregoing. Such communication may be facilitated by a device capable of transmitting data to and from other computers, such as modems (e.g., dial-up, cable or fiber optic) and wireless interfaces.

Although certain advantages are obtained when information is transmitted or received as noted above, other aspects of the subject matter disclosed herein are not limited to a particular manner of transmission of information. For example, in some aspects, information may be sent via a medium such as a disk, tape or CD ROM. Yet further, although some functions are indicated as taking place on a single server having a single processor, various aspects may be implemented by a plurality of servers, for example, communicating information to client devices 101 and 810 over network 795.

Each client device 101 and 810 may be configured similarly to the server 820, with one or more processors 812, memory 814, instructions 816, data 818 and all of the internal components normally found in a personal computer. By way of example only, the client device 810 may include a central processing unit (CPU), display device 813 (for example, a monitor having a screen, a projector, a touch-screen, a small LCD screen, a television, or another device such as an electrical device that is operable to display information processed by the processors 812), CD ROM, hard drive, user input devices 817, such as a keyboard, mouse, touch screen or microphone, speakers, modem and/or network interface device (telephone, cable or otherwise) and all of the components used for connecting these elements to one another.

Client device 810 may be a computing device. For example, client device 810 may be a laptop computer, a netbook, a desktop computer, and a portable personal computer such as a wireless-enabled PDA, a tablet PC or another type of computing device capable of obtaining information via a network like the Internet. Although aspects of the disclosure generally relate to a single client device 810, the client device 810 may be implemented as multiple devices with both portable and non-portable components (e.g., software executing on a rack-mounted server with an interface for gathering location information).

Although the client device 810 may include a full-sized personal computer, the subject matter of the present disclosure may also be used in connection with mobile devices capable of wirelessly exchanging data. For example, client device 810 may be a wireless-enabled mobile device, such as a Smartphone, or an Internet-capable cellular phone. In either regard, the user may input information using a small keyboard, a keypad, a touch screen or other means of user input. In various aspects, the client devices and computers described herein may comprise a device capable of processing instructions and transmitting data to and from humans and other devices and computers.

Instructions 816 and 826 of the client device 810 and server 820 respectively may be a set of instructions to be executed directly (such as machine code) or indirectly (such as scripts) by the processor. In that regard, the terms "instructions," "steps" and "programs" may be used interchangeably herein. The instructions 816 and 826 may be stored in object code format for direct processing by the processor, or in another computer language including scripts or collections of independent source code modules that are interpreted on demand or compiled in advance. Functions, methods and routines of the instructions are explained in more detail below.

Figure 9:
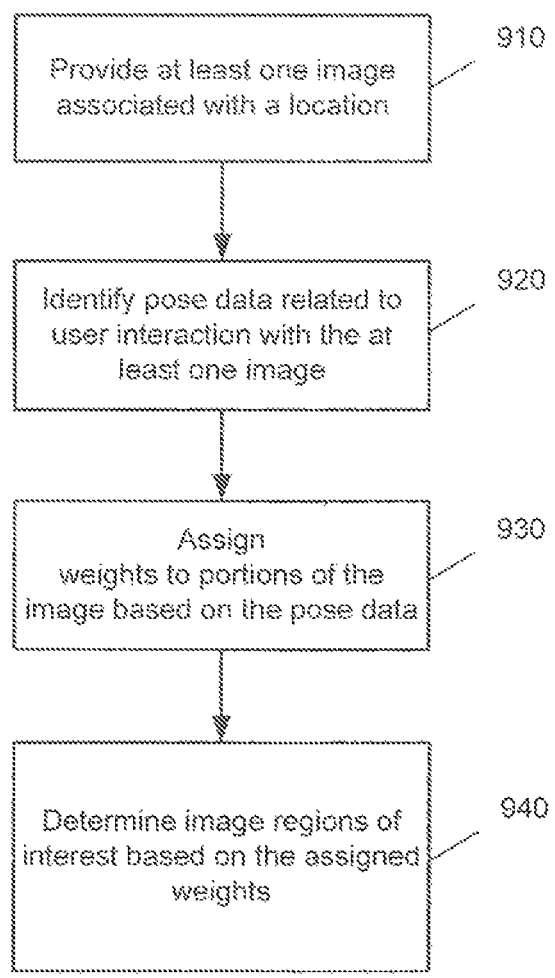
FIG. 9 is a flow diagram of an example method according to aspects of the disclosure.

FIG. 9 is a flow diagram of an example method according to aspects of the disclosure. The following operations do not have to be performed in the precise order described below. Rather, as mentioned above, various operations can be handled in a different order or simultaneously, and operations may be added or omitted.

In block 910, at least one image associated with a geographic location is provided. For example, the image may be a street level panoramic image corresponding to a particular street address, point of interest, point on a map, etc. In some examples, multiple images may be stitched together and provided. The one or more images may be viewable by a user through a viewport. For example, the viewport may be part of a browser, app, computing device, or the like. A field of view of the one or more images may be limited by the viewport.

In block 920, user interaction with the one or more images may be detected. Further, pose data may be identified based on the detected interaction. For example, the user may pan, zoom, rotate, change perspective, or otherwise manipulate the one or more images within the viewport. Pose data relating to a position and/or orientation of the one or more images in the viewport may be collected. Alternatively, viewing time, cursor clicks, cursor hovering, or other interaction may also be collected as pose data.

In block 930, weights are assigned to portions of the one or more images based on the identified pose data. For example, image regions focused at a general center of the viewport by the user for a predetermined period of time may be assigned higher weights than other image regions. In another example, a number of times an image is positioned a particular way or an object within the image is interacted with may be considered. According to some examples, a heat map or other indicator may be generated and used to correlate the assigned weight with the image regions.

In block 940, image regions of interest are determined based on the assigned weights. For example, regions having higher assigned weights may be determined to be regions of interest, while regions having little or no assigned weights may be determined to be of little or no interest to users. According to some examples, this information may be used for a variety of analyses. The image regions of interest may be used to determine how to orient images provided in response to future user requests. For example, the Eiffel tower may be determined to be in an image region of interest based on user interaction with one or more images. Although the Eiffel tower may not be visible in a default view of a nearby address, the default view may be updated to have a different perspective such that the Eiffel tower is at least partially visible. Other examples for using the determined regions of interest include tailoring advertisements, determining objects in the images to be shown more clearly, determining information to be provided on business owner websites, etc. For example, if it is determined that a hot spot for viewer activity corresponds to a menu posted outside or inside a restaurant in the image, this may suggest to the restaurant owner to post the menu on the restaurant's website.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

The invention claimed is:

1. A computer-implemented method for analyzing geographical imagery, the method comprising:
   selecting, by one or more computing devices, an image associated with a geographic location for presentation in a viewport of a client device display;
   identifying, using the one or more computing devices, pose data related to user interaction with the image presented in the viewport;
   assigning, using the one or more computing devices, weights to portions of the image based on the pose data, wherein the portions of the image are weighted according to a corresponding amount of user attention given to each respective portion of the image to assign more weight to a given portion of the image with more user attention, the weights indicating one or more factors selected from the group consisting of: a period of time a given portion of the image is at a central region of the viewport, locations of clicks in the viewport, and cursor movements in the viewport;
   determining, using the one or more computing devices, one or more regions of interest of the image based on the assigned weights; and
   setting, using the one or more computing devices, either a default image or a default view for the geographic location according to the one or more regions of interest, wherein responses to future requests regarding the geographic location provide either the default image or the default view.

2. The method of claim 1, wherein assigning the weights includes increasing the weight to a given portion of the image the longer the given portion is at the central region.

3. The method of claim 1, further comprising determining what part of the image is at the central region of the viewport by placing a 2D Gaussian distribution at a center point of the viewport and stretched the 2D Gaussian distribution to fill the viewport.

4. The method of claim 1, wherein the weights assigned to portions of the image based the locations of clicks in the viewport and cursor movements in the viewport are less than the weights assigned to portions of the image based on the period of time the given portion of the image is at the central region of the viewport.

5. The method of claim 1, wherein regions of the image that are viewed or interacted with more frequently are assigned higher weights than other portions of the image.

6. The method of claim 1, wherein the user interaction includes at least one of zooming or panning the image.

7. The method of claim 6, wherein assigning the weights to portions of the image based on the pose data includes giving more weight to a zoomed in localized area of the image.

8. The method of claim 1, further comprising orienting the image in the viewport based on the determined one or more regions of interest.

9. The method of claim 1, further comprising aggregating pose data of imagery from multiple client device displays.

10. The method of claim 1, further comprising generating one or more thumbnail images for presentation with the image, each thumbnail image corresponding to a given one of the one or more regions of interest.

11. The method of claim 1, further comprising determining supplemental content for presentation in the viewport based on the determined one or more regions of interest.

12. A system for analyzing geographical imagery, the system comprising:
   a memory storing at least one image corresponding to a geographic location;
   one or more processors in communication with the memory, the one or more processors configured to:
      select an image associated with a geographic location for presentation in a viewport of a client device display;
      identify pose data related to user interaction with the image presented in the viewport;
      assign weights to portions of the image based on the pose data, wherein the portions of the image are weighted according to a corresponding amount of user attention given to each respective portion of the image to assign more weight to a given portion of the image with more user attention, the weights indicating one or more factors selected from the group consisting of: a period of time a given portion of the image is at a central region of the viewport, locations of clicks in the viewport, and cursor movements in the viewport;
      determine one or more regions of interest of the image based on the assigned weights; and
      set either a default image or a default view for the geographic location according to the one or more regions of interest, wherein responses to future requests regarding the geographic location provide either the default image or the default view.

13. The system of claim 12, wherein the one or more processors are configured to assign the weights by increasing the weight to a given portion of the image the longer the given portion is at the central region.

14. The system of claim 12, wherein regions of the image that are viewed or interacted with more frequently are assigned higher weights than other portions of the image.

15. The system of claim 12, wherein the user interaction includes at least one of zooming or panning the image.

16. The system of claim 12, wherein the one or more processors are configured to assign the weights to portions of the image based on the pose data by giving more weight to a zoomed in localized area of the image.

17. A non-transitory computer readable medium storing instruction executable by one or more processors to perform a method for analyzing geographical imagery, the method comprising:
   selecting an image associated with a geographic location for presentation in a viewport of a client device display;
   identifying pose data related to user interaction with the image presented in the viewport;
   assigning weights to portions of the image based on the pose data, wherein the portions of the image are weighted according to a corresponding amount of user attention given to each respective portion of the image to assign more weight to a given portion of the image with more user attention, the weights indicating one or more factors selected from the group consisting of: a period of time a given portion of the image is at a central region of the viewport, locations of clicks in the viewport, and cursor movements in the viewport;
   determining one or more regions of interest of the image based on the assigned weights; and
   setting either a default image or a default view for the geographic location according to the one or more regions of interest, wherein responses to future requests regarding the geographic location provide either the default image or the default view.

18. The non-transitory computer readable medium of claim 17, wherein the weights assigned to portions of the image based the locations of clicks in the viewport and cursor movements in the viewport are less than the weights assigned to portions of the image based on the period of time the given portion of the image is at the central region of the viewport.

19. The non-transitory computer readable medium of claim 17, wherein regions of the image that are viewed or interacted with more frequently are assigned higher weights than other portions of the image.

20. The non-transitory computer readable medium of claim 17, wherein the user interaction includes at least one of zooming or panning the image, and assigning the weights to portions of the image based on the pose data includes giving more weight to a zoomed in localized area of the image.

* * * * *